(12) United States Patent
Hanuschak

(10) Patent No.: US 10,182,118 B2
(45) Date of Patent: Jan. 15, 2019

(54) METHOD AND APPARATUS FOR INTERACTING WITH A PERSONAL COMPUTING DEVICE SUCH AS A SMART PHONE USING PORTABLE AND SELF-CONTAINED HARDWARE THAT IS ADAPTED FOR USE IN A MOTOR VEHICLE

(71) Applicant: Gregor Z. Hanuschak, Ardmore, PA (US)

(72) Inventor: Gregor Z. Hanuschak, Ardmore, PA (US)

(*) Notice: Subject to any disclaimer, the term of this patent is extended or adjusted under 35 U.S.C. 154(b) by 409 days.

(21) Appl. No.: 14/683,558

(22) Filed: Apr. 10, 2015

(65) Prior Publication Data

US 2015/0295993 A1 Oct. 15, 2015

Related U.S. Application Data

(60) Provisional application No. 61/978,876, filed on Apr. 12, 2014.

(51) Int. Cl.
| | |
|---|---|
| *H04L 29/08* | (2006.01) |
| *H04M 1/60* | (2006.01) |
| *H04M 1/04* | (2006.01) |

(52) U.S. Cl.
CPC ........ *H04L 67/125* (2013.01); *H04M 1/6083* (2013.01); *H04M 1/6091* (2013.01); *H04M 1/04* (2013.01); *H04M 2250/02* (2013.01)

(58) Field of Classification Search
CPC . H04L 67/125; H04M 1/6091; H04M 1/6083; H04M 2250/02; H04M 1/04; G08C 17/00; G08C 17/02

(Continued)

(56) References Cited

U.S. PATENT DOCUMENTS

| | | |
|---|---|---|
| 5,007,324 A | 4/1991 | DeMichele |
| 5,808,224 A | 9/1998 | Kato |

(Continued)

FOREIGN PATENT DOCUMENTS

| | | |
|---|---|---|
| CA | 2775819 | 4/2011 |
| CN | 203057274 | 7/2013 |

(Continued)

OTHER PUBLICATIONS

Hanuschak, Gregor, "Smack Attack: The drum set for your steering wheel," Kickstarter, 2013, pp. 1-16, retrieved on Jun. 10, 2015, <http://www.kickstarter.com/projects/smackattack/smack-attack-the-drum-set-for-your-steering-wheel>.

(Continued)

*Primary Examiner* — Genna M Mott
(74) *Attorney, Agent, or Firm* — RatnerPrestia

(57) ABSTRACT

Disclosed is a method and apparatus for interacting with a personal computing device such as a smart phone using portable, self-contained hardware that is adapted for use in a motor vehicle. The apparatus includes a user interface designed to receive user input, including tactile user input, from the occupant of the motor vehicle, an electronic interface, electrically coupled to the user interface, removably connectable to the personal computing device, and configured to relay information about the user input to a software application running on the personal computing device, and one or more mounting structures, at least one of which is configured for containing the user interface, at least one of which is configured for containing the electronic interface, and all of which are removably attachable to a portion of the motor vehicle.

20 Claims, 8 Drawing Sheets

(58) Field of Classification Search
USPC .................................................. 455/418–419
See application file for complete search history.

(56) References Cited

U.S. PATENT DOCUMENTS

| | | | |
|---|---|---|---|
| 6,138,041 | A | 10/2000 | Yahia |
| 6,339,700 | B1 | 1/2002 | Tsai |
| 6,341,218 | B1 | 1/2002 | Poplawsky |
| 6,567,676 | B1 | 5/2003 | Tsai |
| 6,697,638 | B1 | 2/2004 | Larsson |
| 7,006,793 | B2 | 2/2006 | Himmel |
| 7,286,857 | B1 | 10/2007 | Walker |
| 7,295,904 | B2 | 11/2007 | Kanevsky |
| 7,332,669 | B2 | 2/2008 | Shadd |
| 7,541,536 | B2 | 6/2009 | Daniel |
| 7,548,770 | B2 | 6/2009 | Tsai |
| 7,554,026 | B2 | 6/2009 | deMoraes |
| 7,689,253 | B2 | 3/2010 | Basir |
| 7,801,283 | B2 | 9/2010 | Harwood |
| 7,898,530 | B2 | 3/2011 | Trachte |
| 8,155,837 | B2 | 4/2012 | Aoki |
| 8,177,182 | B1 | 5/2012 | Wood |
| 8,426,719 | B2 | 4/2013 | Shim |
| 8,481,832 | B2 | 7/2013 | Lloyd |
| 8,515,505 | B1 | 8/2013 | Pattikonda |
| 8,537,133 | B2 | 9/2013 | Trachte |
| 8,538,628 | B2 | 9/2013 | Backman |
| 8,598,444 | B2 | 12/2013 | Morrissey |
| 8,710,346 | B2 | 4/2014 | Behringer |
| 8,725,230 | B2 | 5/2014 | Lisseman |
| 8,772,620 | B2 | 7/2014 | Robertson |
| 8,775,023 | B2 | 7/2014 | Frojdh |
| 8,796,529 | B2 | 8/2014 | Butera |
| 8,865,992 | B2 | 10/2014 | Shavit |
| 9,159,221 | B1* | 10/2015 | Stantchev .............. G08C 17/02 |
| 2005/0052426 | A1 | 3/2005 | Hagermoser |
| 2005/0143134 | A1 | 6/2005 | Harwood |
| 2008/0208925 | A1 | 8/2008 | Shum |
| 2009/0083634 | A1* | 3/2009 | Madonna .............. G06F 3/023 |
| | | | 715/733 |
| 2009/0128286 | A1 | 5/2009 | Vitito |
| 2011/0005367 | A1 | 1/2011 | Hwang |
| 2011/0077028 | A1 | 3/2011 | Wilkes |
| 2011/0136435 | A1 | 6/2011 | Taniguchi |
| 2011/0294490 | A1* | 12/2011 | Faenger ................ G08C 17/00 |
| | | | 455/419 |
| 2012/0080465 | A1* | 4/2012 | Son ....................... B60R 11/02 |
| | | | 224/276 |
| 2012/0125180 | A1 | 5/2012 | Shim |
| 2012/0204704 | A1 | 8/2012 | Shim |
| 2012/0318121 | A1 | 12/2012 | Mittelstadt |
| 2013/0044215 | A1 | 2/2013 | Rothkopf |
| 2013/0076615 | A1 | 3/2013 | Iao |
| 2013/0103779 | A1 | 4/2013 | Bai |
| 2013/0143546 | A1 | 6/2013 | Ricci |
| 2013/0217442 | A1 | 8/2013 | Djordjevic |
| 2014/0033900 | A1 | 2/2014 | Chapman |
| 2014/0058584 | A1 | 2/2014 | Weng |
| 2014/0106734 | A1 | 4/2014 | Lee |
| 2014/0156107 | A1 | 6/2014 | Karasawa |
| 2014/0221040 | A1 | 8/2014 | deMoraes |
| 2014/0281957 | A1 | 9/2014 | Weng |
| 2014/0292661 | A1 | 10/2014 | Graumann |
| 2015/0019967 | A1* | 1/2015 | Gutentag .............. G06F 3/0488 |
| | | | 715/719 |
| 2015/0186983 | A1* | 7/2015 | Gandhi .............. G06Q 30/0641 |
| | | | 705/27.1 |

FOREIGN PATENT DOCUMENTS

| | | |
|---|---|---|
| EP | 2631783 | 8/2013 |
| JP | 2007106353 | 4/2007 |
| WO | 2013042933 | 3/2013 |
| WO | 2013176944 | 11/2013 |

OTHER PUBLICATIONS

MIDI Products, MIDI Manufacturers Association, retrieved Apr. 7, 2015, pp. 1-7, <http://www.midi.org/aboutmidi/products.php>.
Samsung, Samsung Gear S, retrieved Jun. 10, 2015, pp. 1-8, <http://www.samsung.com/us/mobile/wearable-tech/SM-R750PZKASPR>.
SMARTwheel—The First Intelligent Steering Wheel Cover That Helps Prevent Distracted Driving, 2014, pp. 1-4, retrieved on Apr. 7, 2015, <http://www.smartwheelusa.com/pages/about-the-smartwheel>.

* cited by examiner

US 10,182,118 B2

METHOD AND APPARATUS FOR INTERACTING WITH A PERSONAL COMPUTING DEVICE SUCH AS A SMART PHONE USING PORTABLE AND SELF-CONTAINED HARDWARE THAT IS ADAPTED FOR USE IN A MOTOR VEHICLE

RELATED APPLICATIONS

This application claims priority to U.S. provisional application No. 61/978,876 entitled "METHOD AND APPARATUS FOR INTERACTING WITH A PERSONAL COMPUTING DEVICE SUCH AS A SMART PHONE USING PORTABLE AND SELF-CONTAINED HARDWARE THAT IS ADAPTED FOR USE IN A MOTOR VEHICLE", filed on Apr. 12, 2014, the contents of such application being incorporated by reference herein.

BACKGROUND OF THE INVENTION

Traffic jams, long drives, and highway hypnosis are frequent challenges faced by those who drive motor vehicles. Traffic jams and long drives can significantly reduce the time drivers have available to accomplish daily tasks and perform productive work. Furthermore, long drives in particular can make drivers more susceptible to highway hypnosis, also known as "driving without awareness (DWA)" which is a significant cause of driving accidents according to the Department of Motor Vehicles.

Mobile devices such as smart phones, electronic tablets, and laptops are very powerful devices and have many applications, most notably software applications. Without limitation, software applications written for personal computing devices can allow a user to play games, access the Internet, send email, keep track of calendar events, or even connect to other devices using Bluetooth technology. Personal computing devices are also capable of both processing and storing ample amounts of data and many personal computing devices also include microphones, speakers, and accelerometers to detect motion.

Tasks which stimulate the senses and keep the mind occupied can both entertain a driver and help ward off highway hypnosis. Although software applications written for personal computing devices are very capable of stimulating a driver's senses and his mind, use of a personal computing device while driving can be very distracting since the driver must divert his attention away from the road to look at and manipulate the device. It is therefore advantageous to develop a method for interacting with a personal computing device which minimizes these impediments to safe driving.

SUMMARY OF THE INVENTION

In accordance with an aspect of the present invention, there is provided a vehicle-mounted controller for a personal computing device. This vehicle-mounted controller is portable and self-contained and provides a means for a driver to interact with his personal computing device while avoiding potentially dangerous behavior. Without limitation, the user interface of the vehicle-mounted controller is adapted to accept tactile input and, in an embodiment, the user interface includes an array of touch-sensitive sensors. Triggered by tactile input from the driver, each of the touch-sensitive sensors causes a specific signal to be sent to the user's personal computing device. Software resident on the personal computing device can interpret these signals in whatever way is appropriate to the application.

Smart phones, such as Android™, iPhone™, and Microsoft™ phones, are one type of personal computing device and the vehicle-mounted controller makes it easier for a driver to use any of these phones while driving.

DETAILED DESCRIPTION OF THE INVENTION

In the following detailed description of embodiments of the invention, reference is made to the accompanying drawings (where like numbers represent like elements), which form a part hereof, and in which is shown by way of illustration specific embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Figure 1:
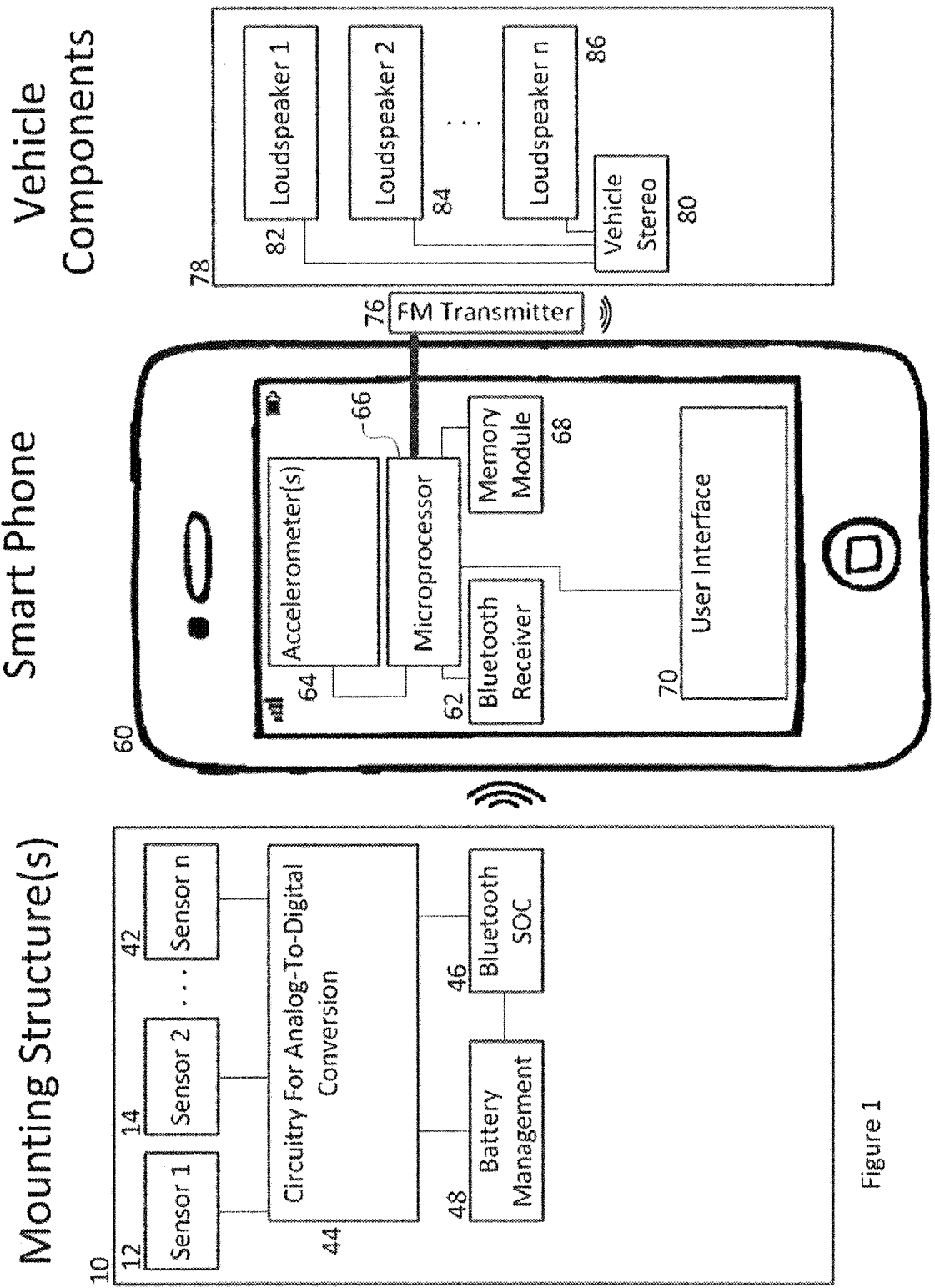
FIGS. 1, 2, 3, 4 and 5 are functional block diagrams for five embodiments of an apparatus in accordance with the present invention delineating major functional components.

FIG. 1 shows an embodiment of the invention in which input from the touch-sensitive sensors 12, 14, . . . 42 is transmitted to the user's personal computing device 60 (e.g. smartphone). All touch-sensitive sensors 12, 14, . . . 42 are contained within the one or more mounting structures 10. Without limitation, touch-sensitive sensors 12, 14, . . . 42 can be simple on/off switches or they can be analog in nature. Without limitation, on/off switches can include momentary switches and fabric sensors. Fabric sensors are advantageous because they are inexpensive and can be cut to any size and shape with ease. These sensors are typically made with two pieces of conductive fabric separated a small distance from each other by a thin foam-like material with one or more holes. When a user exerts sufficient pressure on a fabric sensor, the foam-like material squishes allowing the two pieces of conductive fabric to touch and momentarily complete a circuit.

Piezoelectric sensors are one example of analog sensors. Analog sensors such as piezoelectric sensors produce an output voltage which increases in a manner commensurate with the force at which they are struck, i.e. increasing the force increases the output voltage. Such force data can be valuable to certain applications. As an example, consider the application in which the triggering of touch-sensitive sensors results in the generation of sounds within a vehicle. It may be desired that striking a sensor with greater intensity could result in a louder volume level of the resulting sound. An analog sensor can convey this force information to a personal computing device and software resident on the personal computing device appropriately modifies the volume level of the resulting sounds.

For touch-sensitive sensors 12, 14, . . . 42 that are analog in nature, each sensor is connected to a circuit containing an analog-to-digital converter 44. The circuit containing an analog-to-digital converter 44 would include components to filter, scale, and rectify the signal from the analog sensors. In order to simplify the diagram, functional blocks representing the filtering, scaling, and rectifying steps have been omitted from FIG. 1, however one skilled in the art will recognize that these steps are common when working with analog sensors.

Still referring to the invention of FIG. 1, the one or more mounting structures 10 contain additional functional blocks. An embodiment of the present invention includes a communication interface which, without limitation, makes use of Near Field Communication (NFC), Zigbee, Ultra-Wide Band (UWB), 802.11, infrared, and/or ultrasonic communication techniques and/or the personal computing device's audio jack. In FIG. 1, the communication interface may be a Bluetooth transceiver, for example, a Bluetooth system-on-a-chip. Included in the one or more mounting structures 10 is at least one Bluetooth system-on-a-chip 46 as well as battery management circuitry 48. The battery management circuitry 48 provides power for the Bluetooth system-on-a-chip 46 and also, if present, the circuit containing an analog-to-digital converter 44. Note that if the touch-sensitive sensors 12, 14, . . . 42 are not analog in nature, the circuit containing an analog-to-digital converter 44 is not necessary and signals produced by the touch-sensitive sensors 12, 14, . . . 42 are sent directly to the Bluetooth system-on-a-chip 46. By way of example and not limitation, the Nordic nRF51822 Bluetooth low-energy (LE) chip can be used as the Bluetooth system-on-a-chip 46. The Bluetooth system-on-a-chip 46 can be programmed to send a specific wireless message to the personal computing device whenever one of the touch-sensitive sensors 12, 14, . . . 42 is triggered. The wireless message contains the identity of the triggered sensor and, if the triggered sensor is analog in nature, the message contains voltage information to convey the force at which the sensor was struck.

In an embodiment, the message transmitted from the communication interface includes an integer value (e.g. 0-15 if there are 16 touch sensors). This integer value is used by the personal computing device (e.g. the smartphone) to identify the triggered touch sensor, and is also used to control a software application on the personal computing device according to a function associated with the triggered touch sensor (i.e. the smartphone receives the integer and executes a function in the application that is associated with the integer value). This association between the integer and the function of the application is preprogrammed into the application software by the application developer or a third party.

For example, if the user touches sensor 1 on the device, the smartphone may receive an integer value of 1. An application (e.g. a music-playing application) running on the smartphone identifies that sensor 1 has been triggered based on this integer value. The music application then directs the smartphone to initiate some function (e.g. play a stored music file) associated with the integer value 1. If the user then touches sensor 2 on the device, the smartphone receives an integer value of 2. The smartphone then initiates a function (e.g. stop playing the music file) associated with the integer value 2. The association of the integer values and the functions of the application are pre-programmed into the smartphone so that the smartphone knows how to control the applications based on the integer numbers received from the communication interface. The function initiated by a sensor may vary by application and can even vary within an application. For example, within the music application, sensor 3 might dictate returning to a main menu. After sensor 3 is touched, sensor 1 might now initiate a function to play streaming internet radio.

Although not the only wireless specification available, the Bluetooth LE specification may be used for communication with the personal computing device. A short range specification like Bluetooth is all that is really needed for the disclosed system and use of a longer range specification (like WiFi) would be superfluous. The user's personal computing device is in the vehicle cabin with the driver and thus communication distances should be short. Furthermore, Bluetooth LE in particular requires very little power and thus the specification promotes longer battery life for the overall system. Also contributing to longer battery life, the system may be capable of a low power state when the system is not in use, i.e. the system has not received user-triggered sensor inputs for an extended period of time. This low power state functionality is an additional functionality which can be programmed into the Bluetooth system-on-a-chip 46.

Batteries which power the part of the system contained within the one or mounting structures 10 are included in the battery management circuitry 48. In embodiments, the system is powered by two AAA batteries, however, without limitation coin cell batteries and rechargeable lithium-ion batteries are also possible sources of power.

In further detail, still referring to the invention of FIG. 1, the personal computing device 60 is represented as a smart phone. Without limitation, smart phones include iPhone™ and Android™ phones. Standard and relevant smart phone components include a Bluetooth receiver 62, a microprocessor 66, a memory module 68, and a user interface 70. Many smart phones also include one or more accelerometers 64.

Referring to the invention of FIG. 1 in still further detail, the Bluetooth receiver 62 receives signals sent by the Bluetooth system-on-a-chip 46. Software applications stored in the memory module 68 make use of these signals as input when the software applications are run using the microprocessor 66. The one or more accelerometers 64 are not necessary for system functionality, but if present they can also provide input to software applications running on the microprocessor 66. Accelerometer input can be used to help detect when a vehicle is in motion. Typical elements of the user interface 70 such as, without limitation, touchscreens, track balls, and keyboards can be disabled in software applications when the vehicle is in motion in order to promote safer driving. In situations where a vehicle is moving, a driver can instead use the touch-sensitive sensors 12, 14, . . . 42 to access his smart phone rather than removing his hand from the steering wheel and taking his eyes off the road to manipulate his smart phone directly.

For software applications which produce audio output, this audio can be optionally rerouted to the user's vehicle 78. An example of a software application which produces audio output is the triggering of touch-sensitive sensors to generate sounds within a vehicle. For these audio applications, relevant components of a user's vehicle include the vehicle stereo 80 and the vehicle loudspeakers 82, 84, and 86. Note that a vehicle may have any number of loudspeakers.

Figure 2:
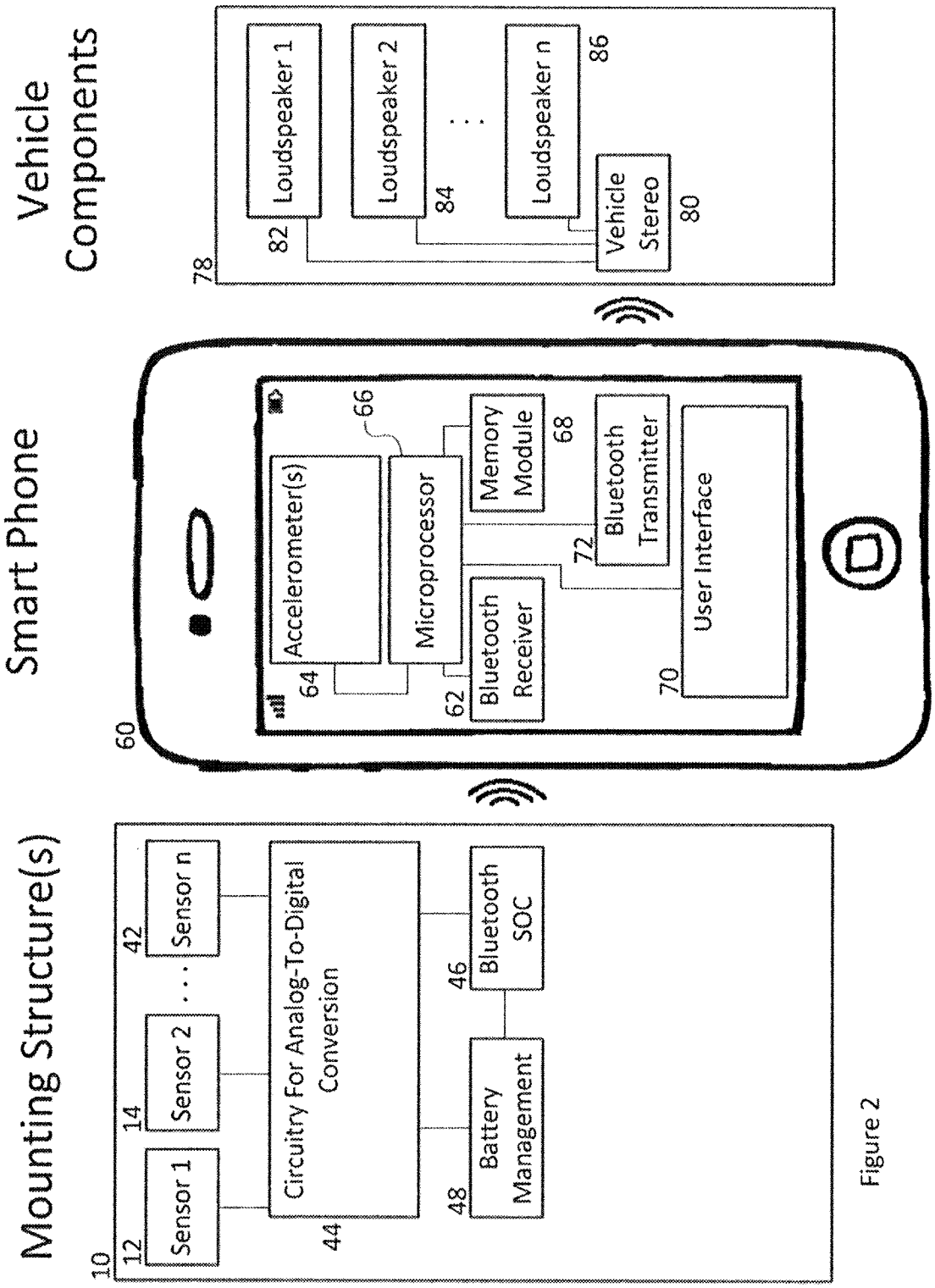
Figure 3:
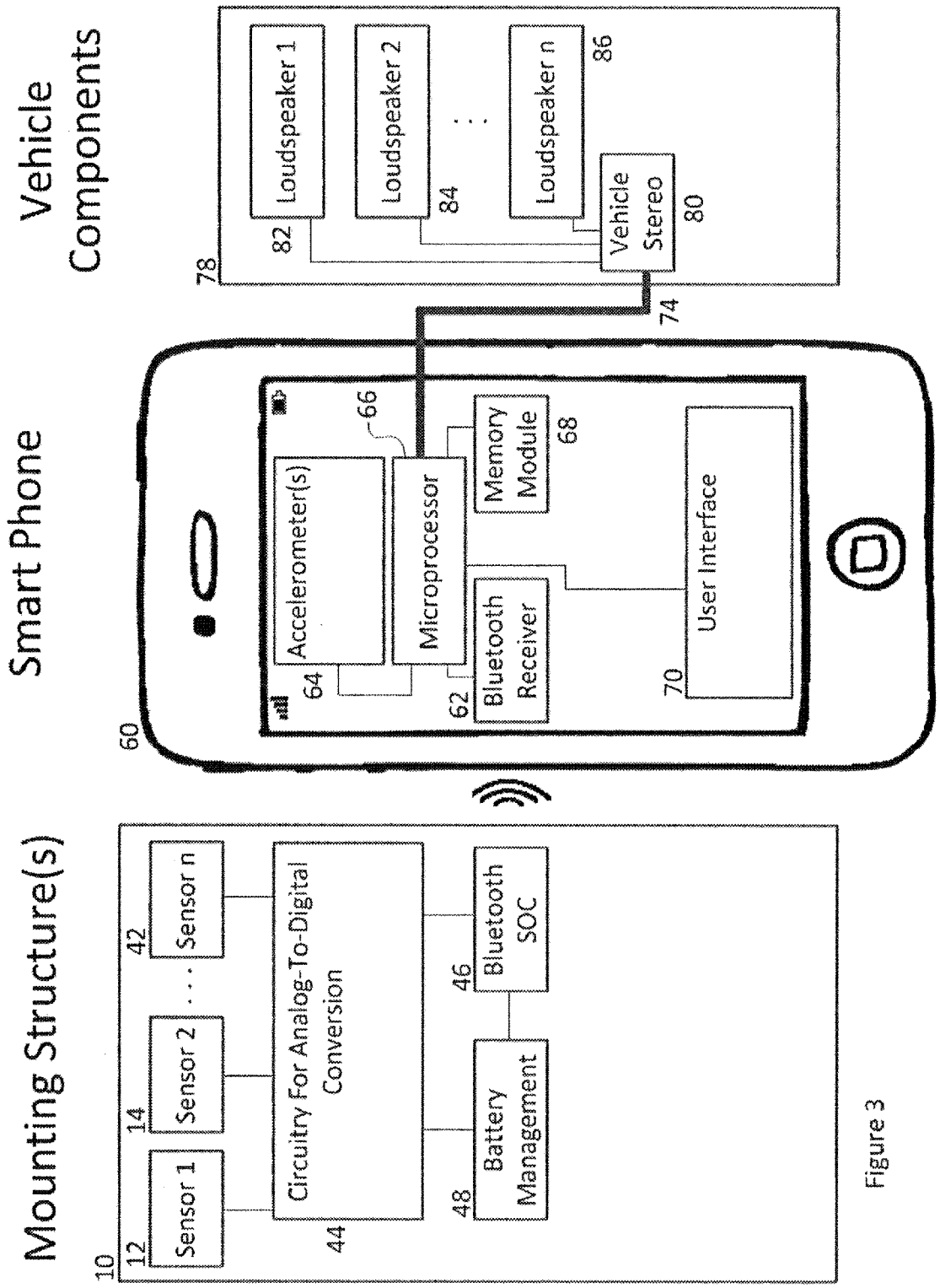

FIG. 1 depicts an embodiment in which the microprocessor 66, running a software application which produces audio output, sends the audio output to the vehicle stereo 80 using an FM transmitter 76. For newer vehicles with Bluetooth capability, an alternative embodiment is depicted in FIG. 2 in which the audio output is instead sent by the microprocessor 66 running the software application to the vehicle stereo 80 by way of a Bluetooth transmitter 72. FIG. 3 depicts yet a third embodiment in which the microprocessor 66 running the software application sends the audio output to the vehicle stereo 80 over a direct electrical connection 74. Without limitation, this third embodiment is most easily realized on a vehicle 78 with a "line-in" adapter for accepting ⅛" miniplugs from audio sources. Most personal computing devices have ⅛" "line-out" adapters which are often used for headphones, ear buds, or computer speakers. In its simplest form, the direct electrical connection 74 is an audio cable with an ⅛" miniplug on either side where one of ⅛" miniplugs is inserted into the "line-out" adapter of the personal computing device 60 and the other ⅛" miniplug is inserted into the "line-in" adapter of the vehicle 78.

Figure 4:
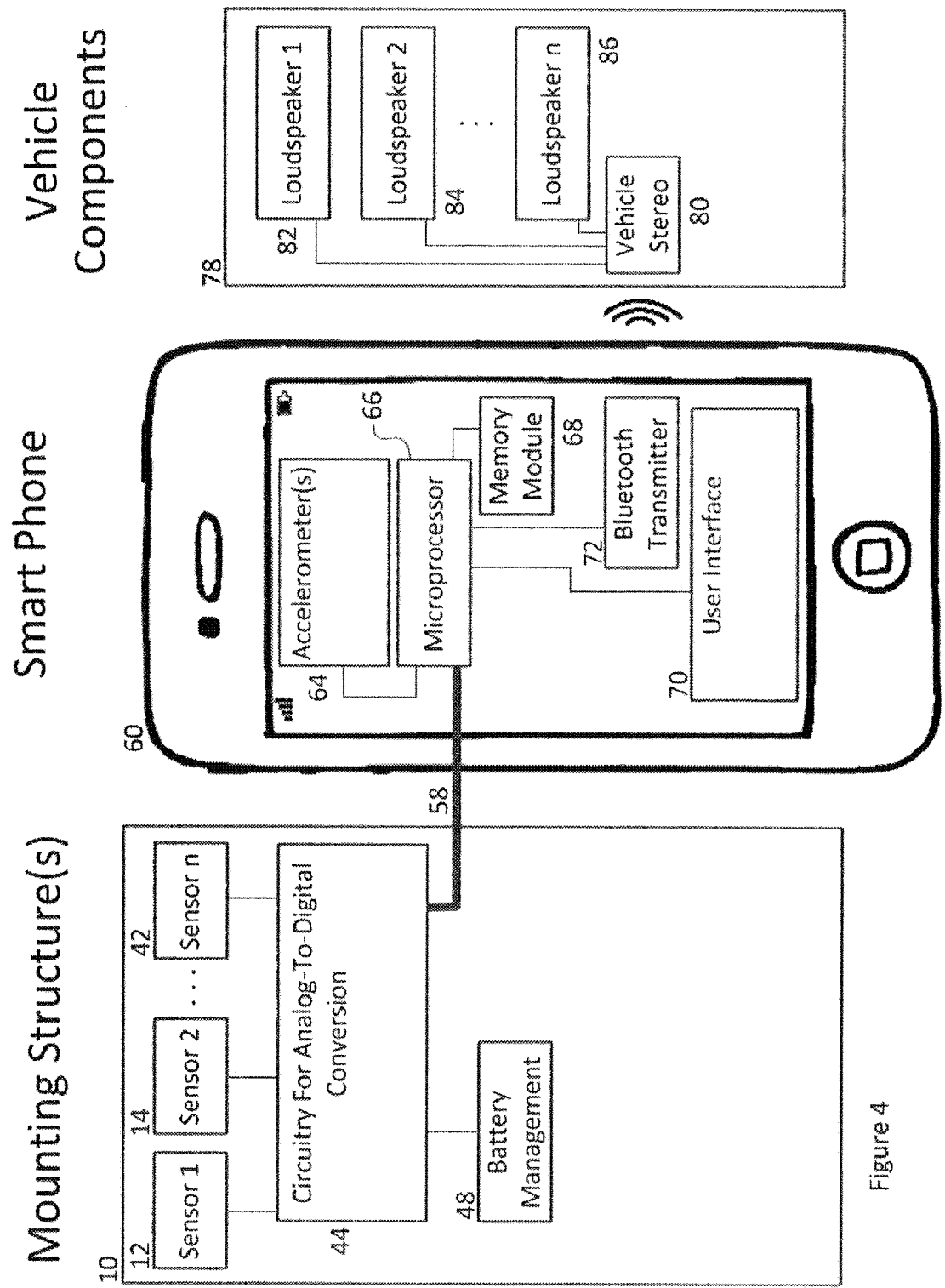

FIG. 4 depicts a fourth embodiment in accordance with the present invention. Although it is often desirable for the signals produced from the touch-sensitive sensors 12, 14, . . . 42 to be transmitted wirelessly to the personal computing device 60, these signals may also be transmitted to the personal computing device 60 by means of a direct electrical connection 58. Without limitation, if the personal computing device 60 was an iPhone™, this direct electrical connection 58 might be attached to the iPhone™ lightning port. In the FIG. 4 embodiment, input from the touch-sensitive sensors 12, 14, . . . 42 is sent directly to the software application running on microprocessor 66. Once again, the circuit containing an analog-to-digital converter 44 performs appropriate filtering, scaling, rectifying, and analog-to-digital conversion if the sensors are analog sensors. For analog sensors, the circuit containing an analog-to-digital converter 44 sends the signals over the direct electrical connection 58. For sensors which are not analog, the circuit containing an analog-to-digital converter 44 is not necessary and the touch-sensitive sensors 12, 14, . . . 42 may send signals directly over the direct electrical connection 58.

Thus far, uni-directional communication with the personal computing device 60 has been discussed, i.e. sending sensor-initiated signals from the one or more mounting structures 10 to the personal computing device 60. However, with the direct electrical connection 58, bi-directional communication with the personal computing device 60 is now possible, i.e. signals emanating from the personal computing device 60 can also be sent to the one or more mounting structures 10.

Figure 5:
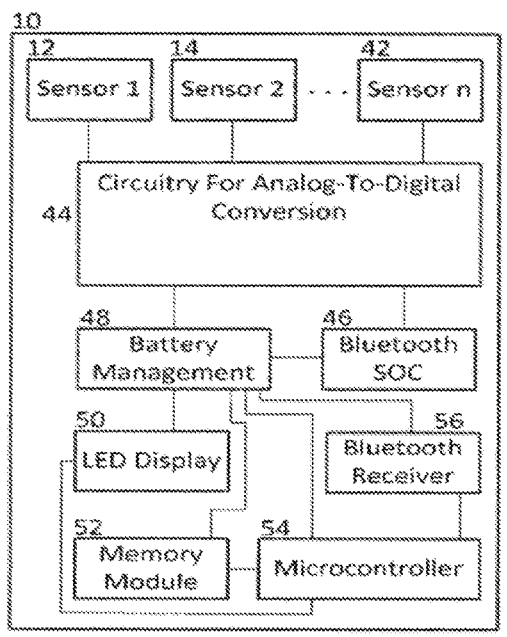
Figure 5:
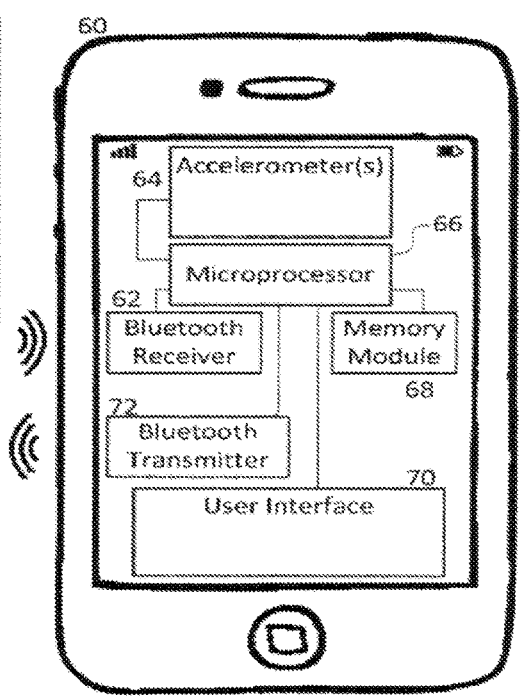

FIG. 5 shows an embodiment which utilizes bi-directional communication. In this embodiment, signals emanating from the personal computing device 60 are not sent over a direct electrical connection. Instead, the signals are sent wirelessly. A software application running on microprocessor 66 may produce graphics data to be displayed. This graphics data can be wirelessly transmitted by way of a Bluetooth transmitter 72. It should be noted that in applications for transmitting high-fidelity graphics data, Bluetooth Classic protocol may be used due to the protocol's higher data rates (i.e. higher than Bluetooth LE protocol).

The embodiment depicted in FIG. 5 contains additional components within the one or more mounting structures 10 for receiving and displaying graphics data. Most notably these components include a LED display 50, a memory module 52, a microcontroller 54, and a Bluetooth receiver 56. The battery management circuitry 48 provides power to these additional components.

Still referring to the embodiment of FIG. 5, the Bluetooth receiver 56 can receive graphics data from the Bluetooth transmitter 72. Using instructions stored on the memory module 52, the microcontroller 54 ensures that the graphics data received by the Bluetooth transmitter 72 is properly displayed on the LED display 50.

Figure 6:
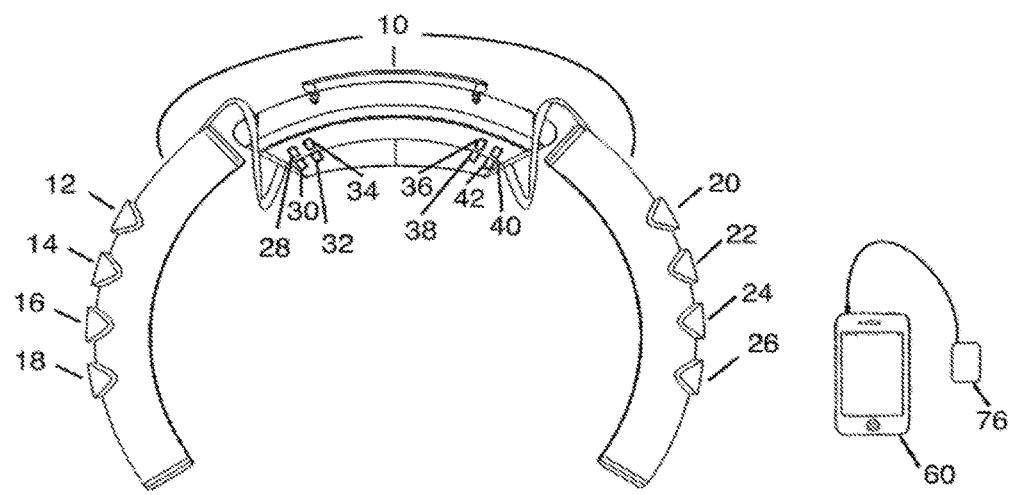
FIG. 6 shows an embodiment in which the touch-sensitive sensors are mounted on a steering wheel cover and a personal computing device is nearby to receive input initiated by the sensors.
Figure 7:
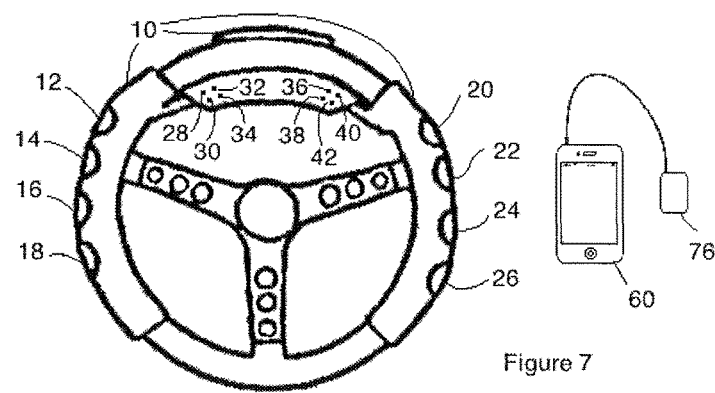
FIG. 7 depicts the same embodiment as FIG. 6, but shows further detail on how the steering wheel cover mounts on the steering wheel.

FIG. 6 and FIG. 7 both depict the same physical embodiment of the invention which was described by the functional block diagram of FIG. 1. FIG. 6 depicts the invention before it is mounted on a steering wheel and FIG. 7 depicts the invention after it is mounted. In this physical embodiment, three (3) mounting structures make up the one or more mounting structures 10 with the center mounting structure connected by wires to each of the two outer mounting structures. One set of wires carries the electrical signals to the center mounting structure from the touch-sensitive sensors 12, 14, 16, and 18 contained in one of the outer mounting structures while the other set of wires carries the electrical signals from the touch-sensitive sensors 20, 22, 24, and 26 contained in the second of the outer mounting structures. Wireless signals produced by the apparatus are received by the personal computing device 60, which, in turn, may produce audio output which is wirelessly transmitted using the FM transmitter 76.

Still referring to the embodiment of FIG. 6 and FIG. 7, the center mounting structure is made out of hard plastic or another sufficiently rigid material and is removably attached to the steering wheel by means of a clamp which can be tightened around the steering wheel using a screw. This center mounting structure also contains 8 of the 16 touch-sensitive sensors, namely touch-sensitive sensors 28, 30, . . . 42, and the circuit board with the electrical components necessary for communication with the personal computing device 60.

In further detail, still referring to the embodiment of FIG. 6 and FIG. 7, the outer two mounting structures are made of soft plastic, rubber, or a similar flexible material and each is removably attached to the steering wheel by means of a pressure fit around the steering wheel and two velcro straps (one at each end). Each outer mounting structure is molded to fit, almost precisely, the size and shape of a steering wheel and the velcro straps can pull tighter to force the flexible material of the mounting structure to flex inward and create more friction between the mounting structure and the wheel. Each of the outer two mounting structures also contains 4 of the 16 touch-sensitive sensors, with one of these mounting structures containing touch-sensitive sensors 12, 14, 16, and 18 and the other containing touch-sensitive sensors 20, 22, 24, and 26. All of the touch-sensitive sensors 12, 14, . . . 26 are fabric sensors. Finally, each outer mounting structure is covered by a fabric overwrap except the portion of each outer mounting structure in contact with the steering wheel and except the areas of each outer mounting structure directly above each of the fabric sensors. This area above the fabric sensors is covered with velcro. Velcro sewn onto or otherwise adhered to fabric patches attach to the velcro covering the area above the fabric sensors.

Figure 8:
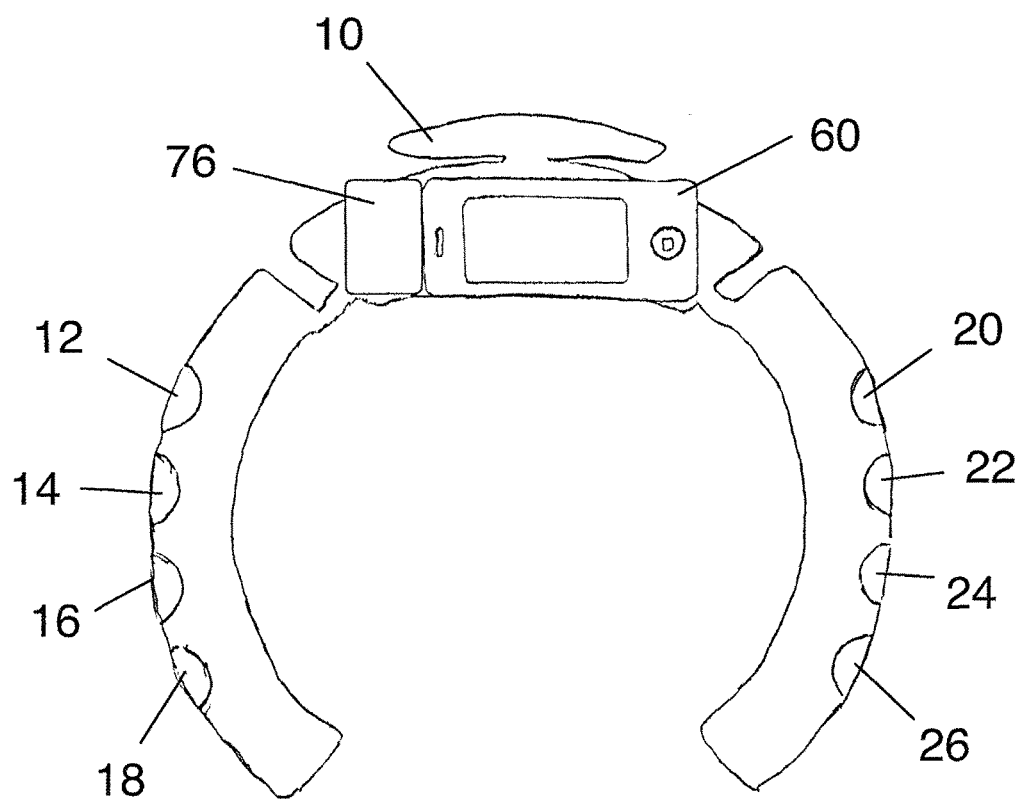
FIG. 8 shows an embodiment of the invention which can be mounted on a steering wheel, but with the personal computing device attaching directly to one of the mounting structures to receive signals from the sensors through a direct electrical connection.

FIG. 8 depicts a physical embodiment of the functional block diagram shown in FIG. 4. FIG. 8 shows a wired connection between a smart phone (representing the personal computing device 60) and a steering wheel cover (representing one or more mounting structures 10) in which the smart phone snaps into the wheel cover to make the direct electrical connection 58 depicted in FIG. 4. In this embodiment, the smart phone's user interface 70 is more accessible and can even provide an alternative graphics display to FIG. 5's LED display 50.

Figure 9:
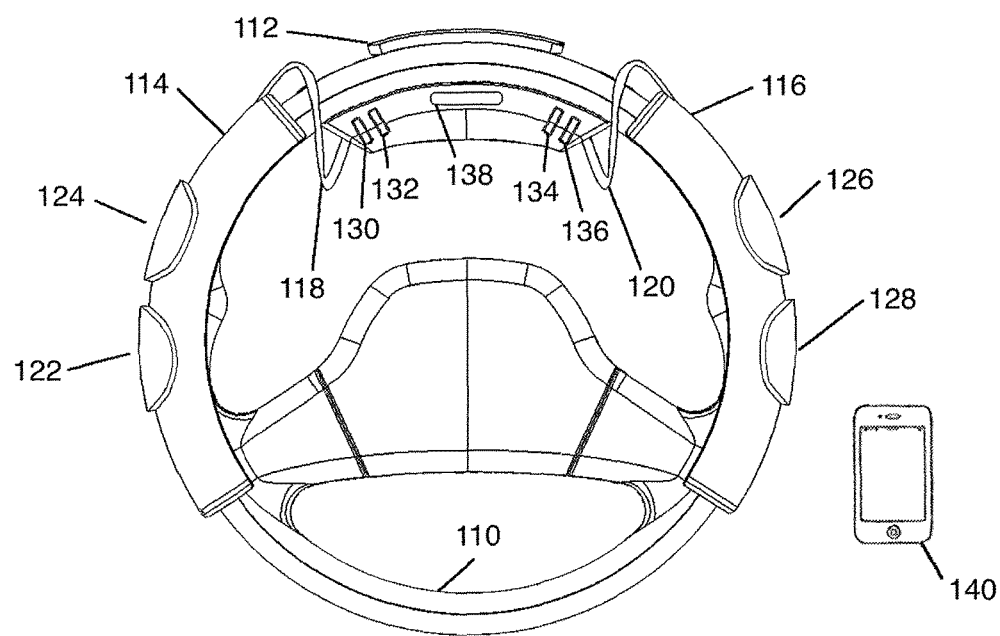
FIG. 9 shows an embodiment of the invention which can be mounted on a steering wheel, but with an alternative number of touch-sensitive sensors and an LED display contained within the one of the mounting structures.

FIG. 9 depicts a physical embodiment which utilizes a bi-directional communication channel with a personal computing device, in this case personal computing device 140. This bi-directional communication channel is akin to the bi-directional communication channel depicted in the functional block diagram shown in FIG. 5. FIG. 5 discusses a LED display 50 contained with one or more mounting structures 10 and in FIG. 9 the LED display 138 is contained within center mounting structure 112.

Still referring to the invention of FIG. 9, the touch-sensitive sensors 122, 124, . . . 136 are contained within the three (3) mounting structures: center mounting structure 112, leftmost mounting structure 114, and rightmost mounting structure 116. Center mounting structure 112 is removably attached to the motor vehicle's steering wheel 110 by means of a clamp and contains the electronics interface as well as touch-sensitive sensors 130, 132, 134, and 136. Leftmost mounting structure 114 is removably attached to the motor vehicle's steering wheel 110 by means of a pressure fit, i.e., the mounting structure is molded to fit, almost precisely, the size and shape of a steering wheel and is made out of flexible material which flexes inward to make a stronger grip on a steering wheel and thus, the mounting structure fits snugly on the steering wheel and is unable to significantly deviate its position on the steering wheel. Touch-sensitive sensors 122 and 124 are contained within leftmost mounting structure 114 and wire bundle 118 carries signals from these sensors to the electronics interface within center mounting structure 112. Similarly, rightmost mounting structure 116 is also removably attached to the motor vehicle's steering wheel 110 by means of a pressure fit and contains touch-sensitive sensors 126 and 128. Wire bundle 120 carries signals from these sensors to the electronics interface.

Figure 10:
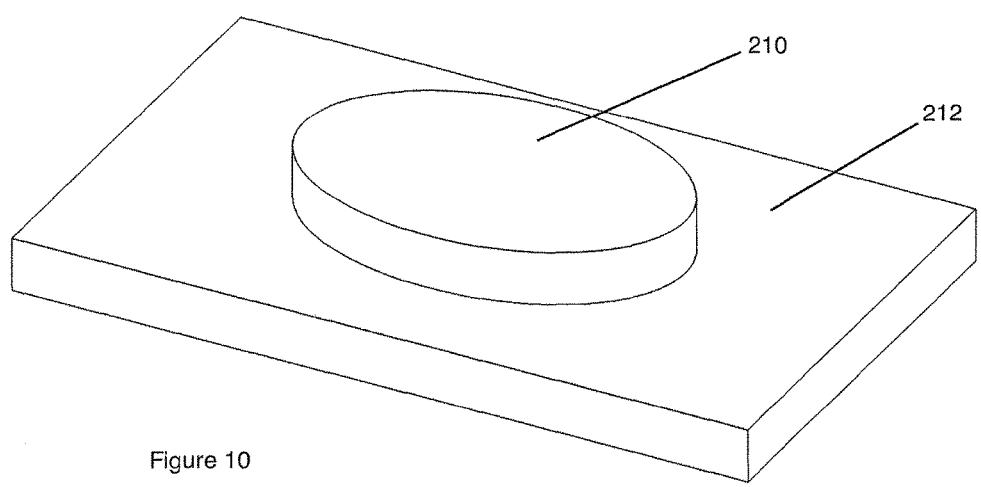
FIG. 10 shows an embodiment of the invention in which individual sensors are each contained in their own mounting structures.
Figure 11:
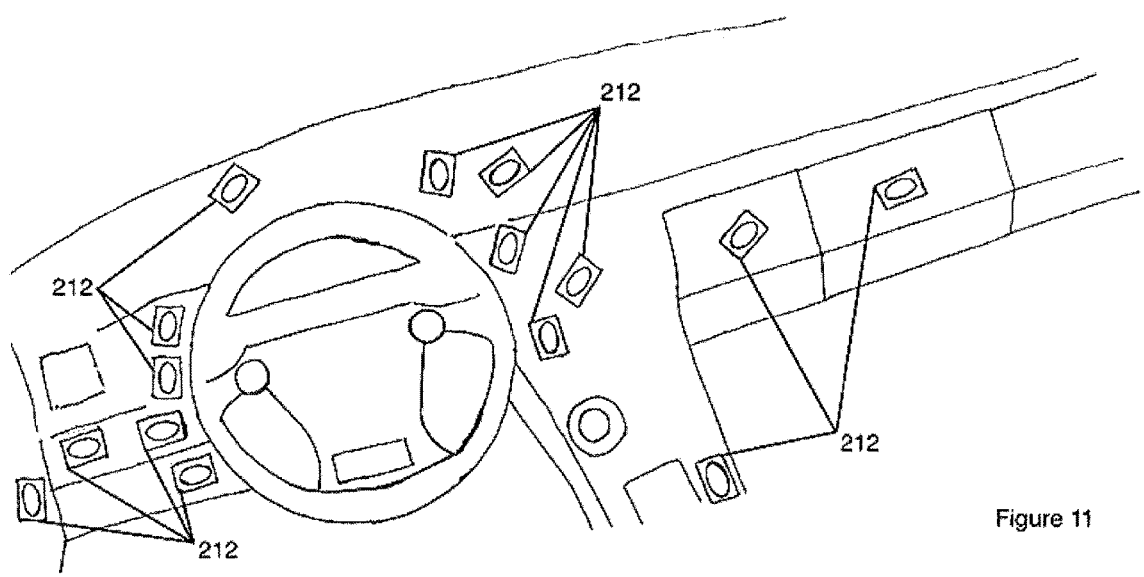
FIG. 11 shows these mounting structures attached to surfaces in a vehicle.

FIG. 10 depicts a physical embodiment in which an individual touch-sensitive sensor 210 is contained in its own mounting structure 212. One or more instances of the mounting structure 212 can be placed in desired locations within the motor vehicle as shown in FIG. 11. Without limitation, velcro can be used to removably attach a mounting structure 212 to its desired location within the motor vehicle. In this embodiment, velcro is located on the side of mounting structure 212 which is opposite the side on which touch-sensitive sensor 210 is located. Mated for attachment with the velcro on mounting structure 212, an adhesive piece of velcro is adhered to the interior of the motor vehicle at the desired location.

Still referring to the embodiment of FIG. 10 and FIG. 11, it is important to note that although one or more individual touch-sensitive sensors could be used on their own to provide input to a software application running on a personal computing device, these sensors could also be used in conjunction with the embodiment depicted in FIG. 6, FIG. 7, FIG. 8, or FIG. 9 to provide such input to a software application. The software applications residing on the personal computing device (e.g. the smartphone) may be preprogrammed on the personal computing device or downloaded to the personal computing device from a network (e.g. Cellular, WiFi, etc.). Such software applications may include third party applications. In addition, the software applications may include a HUB software application.

The HUB software application is resident on the personal computing device and acts as a master controller for all compatible applications stored on the personal computing device. Once the HUB is opened, a user (e.g. driver) can easily access any HUB compatible application without touching their personal computing device (e.g. smartphone). In an embodiment, a user (e.g. driver) can manipulate two of the touch-sensitive sensors 12, 14, . . . 42, and in doing so, send signals to the smartphone which indicate the user's desire to switch the application that they are currently controlling. The HUB uses these signals to switch between and otherwise control the applications.

In general, when a developer of applications creates a new application (or modifies an existing application), the developer inserts an identifier in the software code to indicate compatibility with the HUB. Any application stored on the personal computing device with this identifier will be found automatically by the HUB, and once found, will be available for selection and control by the user (e.g. driver).

In one implementation example, the HUB automatically alphabetizes all the applications on the personal computing device which are compatible with the hardware. Two of the touch-sensitive sensors 12, 14, . . . 42 allow for cycling through these applications. Touching a sensor labeled "next", for example, selects the next application in alphabetical order and a sensor labeled "previous" selects the previous application in alphabetical order. When either of these sensors is touched, the HUB suspends the active application, announces (e.g. over the speakers of the personal computing device) the name of the "next" or "previous" application in alphabetical order, and makes the announced application the active application on the personal computing device.

In addition to the sensors labeled "next" and "previous", embodiments of the hardware's user interface include additional sensors (e.g. 14 additional sensors). If the user touches one of these additional sensors, the active application learns about it by way of the HUB. Upon learning a particular sensor was touched, the active application provides functionality to the user through the computer code written by the developer of the application. Without limitation, such functionality may include activating speech to text processing to accept verbal commands from the user, searching the internet for particular information, placing a phone call for the user, sending a text message or email for the user, dictating to the user a received text message or email over the speakers of the personal computing device, or providing functionality from another device which is connected to the personal computing device by a wired or wireless connection.

In one embodiment, the HUB designates one of the additional sensors as the "help button". When the "help button" is touched, the HUB waits until the user touches another sensor before taking action. If the next sensor touched is "help", "next", or "previous", the HUB announces (e.g. over the speakers of the personal computing device) the appropriate functionality of that sensor. However, if the next sensor touched is one of the other additional sensors, the HUB sends a message to the active application asking for information on the current functionality of that sensor in the current application. Once receiving such information, the HUB announces (e.g. over the speakers of the personal computing device) that sensor's functionality. In this way, if the user forgets what a sensor does, they can always use the "help button" to get a reminder.

A boundless number of software applications could be developed to interact with the disclosed embodiments, however, some examples include: 1.) a software application in which any of the touch-sensitive sensors can be triggered to generate sounds within a vehicle, 2.) a software application to help with productivity while driving: trigger sensors to take phone calls, dictate notes & calendar events, dictate & send text messages, dictate & send emails, hear emails & text messages dictated to you, and even connect to popular productivity tools such as, without limitation, Evernote™ and Asana™, 3.) a software application to help keep up to date on the news of the day: trigger sensors to get the personal computing device to dictate tweets (from Twitter™), the user's Facebook™ feed, or current news (pulled from the Internet) in the user's category of choice such as, without limitation, sports scores, stock market, world news, or weather, and 3.) a software application that gives local information: trigger sensors in which each sensor corresponds to a different local category of interest including, without limitation, searching the user's route or current local area to find the gas station with the lowest prices, the hotel with the best deal according to Hotwire™, or the best restaurant according to Yelp™. Referring further to the software application that gives local information, triggering another sensor might set the GPS for one of the proposed newly discovered destinations while still avoiding the areas which are currently traffic congested. Without limitation, other potential software applications might include: 1.) an application that lets you connect to Pandora™, Spotify™, or iHeartRadio™, 2.) an application that gives multiple choice Jeopardy-esque trivia questions: trigger a sensor to choose an answer, and 3.) an application that helps you learn another language: multiple choice vocabulary questions: trigger a sensor to choose an answer.

There are already car systems in existence that make it easier for drivers to use cellular phones while driving. One such system is an apparatus which holds a cellular phone so the driver doesn't have to. Other such systems include user interfaces for accepting tactile input. These user interfaces are designed such that a driver can physically dial phone numbers and perform basic phone functions while driving.

Although such systems all describe portable self-contained systems adapted for use in motor vehicles, all of these systems are significantly different from the vehicle-mounted controller described herein. First, the vehicle-mounted controller includes a user interface. Some systems may include user interfaces, but they are not configured to interact with a smart phone or any other personal computing device (i.e. they interact with cell phones).

Unlike smart phones, cellular phones only have a limited number of applications: they can make phone calls and they can receive phone calls. Many cellular phones also store contact information, send and receive text messages, and even take pictures, but that's nothing compared to the functionality of a smart phone. In addition to taking and receiving phone calls, smart phones can also run software applications developed by third parties. These software applications can assist a user with social networking, music selection, searching for good local fuel prices, and much more. Therefore, the disclosed vehicle-mounted controller and its embodiments described herein represent a significant improvement over these systems, since the disclosed embodiments allow a user to interact with a more advanced technology: a smart phone.

Several systems also exist for car systems that accept voice commands from drivers. One such apparatus accepts driver voice commands as a means to operate a cellular phone. With this apparatus, a driver can speak into a microphone, which serves as part of the apparatus, and tell the apparatus which person or phone number to dial. After receiving the voice command to dial, the apparatus will perform the dialing operation on behalf of the driver.

As previously discussed, the vehicle-mounted controller is a significant improvement over an apparatus that communicates with cellular phones, but not smart phones. Car systems do exist that accept voice commands for smart phones and for devices equivalent to personal computing devices, but even these systems have their disadvantages when compared to the vehicle-mounted controller. Unlike the disclosed vehicle-mounted controller, these systems fail to consider the possibility of controlling software applications with their devices. The disclosed vehicle-mounted controller can be used to operate basic phone functions in addition to operation of third-party software applications.

Furthermore, systems, like the vehicle-mounted controller, which accept tactile input from a user interface, have several advantages over systems that only accept voice commands. First, certain software applications are more easily controlled by a tactile user interface than they are with voice commands. Consider the embodiment in which the user interface includes an array of touch-sensitive sensors. Also consider the software application in which: 1.) any of the touch-sensitive sensors can be triggered by a user in order to generate sounds within a vehicle and 2.) these sounds often consist of drum sounds. For such an application, the speed at which inputs are received and processed is important. It is more intuitive and faster for a driver to trigger a touch-sensitive sensor than to vocalize the words "bass drum", "snare", "tom drum", or similar. It is also faster to process input from a triggered sensor with a pre-determined associated sound than it is to compare vocal user input with a library of voice commands to determine which (if any) voice command was spoken. In summary, to use voice commands to operate the described software application would be cumbersome. By the time a user would finish vocalizing the word "bass drum", the moment of the desired bass drum sound will have past. In this application, the user desires that sounds (especially drum sounds) should be played at certain precise instants in order to keep a rhythm.

A second limitation of voice commands is that of conflicting auditory input. In the previously described software application, voice commands would also be inappropriate since a user would want to listen to the drum sounds he/she produced and not be distracted by his/her own voice commands. Also, if voice commands were used to add sounds (especially drum sounds) to a song which has a vocalist, it is possible that the vocalist might recite some of the voice commands in the lyrics, thus directing the system to produce additional unexpected and unwanted sounds. Inadvertent use of voice commands occurring within the vehicle during conversations (including phone conversations) can also produce unwanted results. This is not the case with the vehicle-mounted controller, because the user interface accepts tactile input provides a means for simultaneous and conflict-free operation of third-party software applications while talking on the phone or talking to others in the car.

Still further systems exist for car systems which communicate with personal computing devices that use tactile-input user interfaces. These systems, however, require that the system communicating with the personal computing device be installed within the vehicle itself either at the time of assembly at the vehicle manufacturing facility or installed later by a mechanic or an experienced professional. The vehicle-mounted controller is different than these systems, because unlike the systems, installing the vehicle-mounted controller does not require assistance from a mechanic or experienced professional. A layperson can quickly and easily render the apparatus operational and, just as quickly and easily, remove the system from the vehicle for use in another vehicle.

The simplicity of setup for the vehicle-mounted controller is due to the invention's portable nature: all system components are contained within portable mounting structures. The one of more mounting structures can easily attach to elements of the vehicle interior and each contain electrical components necessary for system functionality.

For the vehicle-mounted controller and many other embodiments, the most notable electrical component provided in the user interface is the array of 16 touch-sensitive sensors. Without loss of generality, the array of sensors could be anywhere within the driver's reach, however, many embodiments place these sensors within a steering wheel cover. In these embodiments, both hands can always stay in proximity to the steering wheel and the driver's eyes never need to leave the road.

In some steering wheel cover embodiments, the 16 touch-sensitive sensors are contained within three (3) mounting structures configured to be mounted on the vehicle's steering wheel. When a sensor is triggered, a signal is sent to the personal computing device. The signals can be sent to the personal computing device via a direct electrical connection or the signals can be sent wirelessly using a transmitter. For embodiments in which the signal is sent using a transmitter, this transmitter may be a Bluetooth transmitter.

Still further, there are other portable, self-contained systems which include tactile-input user interfaces that wirelessly communicate with personal computing devices. These systems include a tablet with a touchscreen larger than that of a smart phone which emulates and enlarges the smart phone touchscreen in order to make it easier to discern what is displayed on the screen. Other such systems are wearable technology, most notably technology meant to be worn on a person's wrist like a wristwatch. Although all of these systems may be beneficial in certain situations, it's not any more safe to look at or manipulate a tablet or a wristwatch while driving than it is to look at or manipulate the personal computing device itself. Once again, the vehicle-mounted controller is different. The vehicle-mounted controller allows a driver to interact with a personal computing device in such a way that the driver never needs to look away from the road.

Although in-vehicle sound generation is one application of a vehicle-mounted controller for personal computing devices, one skilled in the art will realize that there are greater implications of the controller's tactile-input user interface including, without limitation, the embodiment in which the user interface includes 16 touch-sensitive sensors. The disclosed sensors provide a way to capture user input much like a keyboard or mouse can capture user input for a computer. In a software application written for a smart phone, a user might trigger one of the sensors to indicate his desire to make a phone call. In another software application, triggering the same sensor might indicate a user desire to dictate a calendar event using a microphone attached to the personal computing device or a desire have an email read aloud over the speakers of the personal computing device. Software applications dictate what effects user input can produce, but any software application capable of running on a personal computing device can be modified to accept input from the user interface of the vehicle-mounted smart phone controller.

Provided herein is a description of an apparatus for accepting, from an occupant of a motor vehicle, user input to be used by a software application running on a personal computing device. The apparatus includes a user interface designed to receive the user input, including tactile input, from the occupant of the motor vehicle, and an electronic interface, electrically coupled to the user interface, removably connectable to the personal computing device, and configured to relay information about the user input to the software application. The apparatus also includes one or more mounting structures, at least one of which is configured for containing the user interface, at least one of which is configured for containing the electronic interface, and all of which are removably attachable to a portion of the motor vehicle, so that the user input received by the user interface is relayed by the electronic interface to the software application.

Without limitation, the personal computing device can be a smart phone, electronic tablet, or laptop. The term "smart phone" includes, without limitation, Android™, iPhone™, and Microsoft™ phones, while the term "electronic tablet" includes, without limitation, Android, iPad, and Windows-based tablets.

In an embodiment, a portion of the user interface is contained within more than one of the mounting structures. The user interface may include, without limitation, rotary dials, a microphone, a digital camera, a touchscreen, one or more infrared sensors, and/or one or more photovoltaic sensors for receiving user input.

The user interface may also include, without limitation, one or more touch-sensitive sensors designed to allow a signal to be passed to the electrical interface upon receiving tactile input. The electronic interface relays information to the software application running on the personal computing device regarding, without limitation, which of the touch-sensitive sensors has just received tactile input.

In an embodiment, one or more of the one or more touch-sensitive sensors are momentary switches which allow a discrete signal to be passed to the electrical interface upon receipt of the tactile input. In one such embodiment, the momentary switches are fabric sensors, i.e. sensors made with two pieces of conductive fabric separated a small distance from each other by a thin foam-like material. The foam-like material has one or more holes such that a circuit is momentarily completed when a user exerts sufficient pressure on the fabric sensor to squish the foam-like material enough for the two pieces of conductive fabric to come in contact with each other.

In another embodiment, one or more of the one or more touch-sensitive sensors are analog sensors capable of approximating the relative force of tactile input imparted upon them. In one such embodiment, the analog sensors are piezoelectric sensors. Whenever any of these analog sensors receives tactile input, an analog signal containing information about the relative force of the tactile input is sent to the electronic interface. In such an embodiment, the electronic interface includes a circuit containing a.) electrical components necessary to filter, scale, and rectify the analog signal passed to the electrical interface into a filtered, scaled, and rectified version of the analog signal and b.) an analog-to-digital converter for converting the filtered, scaled, and rectified version of the analog signal to a discrete version of the signal. The filtered, scaled, rectified, and discretized version of the signal, which includes information regarding the relative force of tactile input, is then included in the user input information relayed to the software application. In an embodiment, the area above each of the touch-sensitive sensors is covered with velcro and said velcro is meant to attach to velcro sewn onto, or otherwise adhered to, fabric patches.

In an embodiment, the electronic interface is removably connectable to the personal computing device by means of a wire, cable, or other direct electrical connection, and the wire, cable, or other direct electrical connection is attached to, without limitation, a firewire port, USB port, or iPhone™ lightning port.

In an embodiment, the one or more mounting structures is configured to removably receive the personal computing device and hold it in place within this mounting structure. The personal computing device can be held in the mounting structure by means of, without limitation, one or more of: a suction cup, a spring clip, a clamp which can be tightened about the personal computing device using one or more screws, an adhesive velcro strip adhered to the personal computing device and mated for attachment with velcro sewn onto, or otherwise adhered to, a portion of the mounting structure, a strap or pair of straps made of, without limitation, elastic, fabric, or plastic, configured to be tightened about the personal computing device to hold it in place, and a pressure fit such that a portion of the mounting structure is molded to precisely accept the size and shape of the personal computing device snugly such that, when the personal computing device is inserted into said portion of the mounting structure, the personal computing device is prevented from moving in one or more directions with respect to the mounting structure.

In an embodiment, the electronic interface a.) includes one or more wireless transmitters and b.) is removably connectable to the personal computing device by means of one or more wireless connections established between any of its one or more wireless transmitters and a wireless receiver contained within the personal computing device. The one or more wireless transmitters use a wireless specification such as, without limitation, Wi-Fi, Bluetooth 3.0, or Bluetooth LE, and each of the one or more wireless transmitters can be, without limitation, a Bluetooth system-on-a-chip such as, without limitation, a Nordic nRF51822 Bluetooth low-energy (LE) chip, a Texas Instruments CC2540, a CSR 1011, or a Bluegiga BLE112 Bluetooth Smart module. In one such embodiment, the apparatus can enter a low power state when the user interface has not received user input for an extended period of time due to a functionality programmed into each instance of the Bluetooth system-on-a-chip.

In an embodiment, electrical components within the electronic interface are powered by one or more batteries, where the one or more batteries are, without limitation, AAA batteries, a coin cell battery, or a rechargeable lithium-ion battery. The electronic interface may also include, without limitation, a kinetic energy gathering component, wherein the one or more batteries can be trickle charged by the kinetic energy gathering component.

In an embodiment, a portion of the electronic interface is contained in more than one mounting structure. In one such embodiment, portions of the electronic interface are connected together by means of wires, cables, or other direct electrical connection and each portion of the electronic interface is connected to at least one other portion of the electronic interface. Without limitation, these portions of the electronic interface could alternatively be connected together by wireless connection such that each wirelessly connected portion has one or more wireless transmitters and/or one or more wireless receivers in order to establish the wireless connection.

In an embodiment, there is at least one adhesive piece of velcro adhered to the interior of the motor vehicle and at least one of the mounting structures has velcro mated for attachment to the velcro adhered to the interior of the motor vehicle. In another embodiment, one or more of the mounting structures are removably connected to the interior of the motor vehicle by means of, without limitation, adhesive and/or one or more suction cups.

In yet another embodiment, one or more of the mounting structures are each removably connected to the steering wheel of the motor vehicle by means of, without limitation, one or more of: a spring clip configured to grab the steering wheel, a clamp which can be tightened around the steering wheel using one or more screws, a strap or pair of straps made of, without limitation, elastic, fabric, or plastic, configured to be wrapped around the steering wheel and tightened, and a pressure fit such that the mounting structure is a.) molded to fit, almost precisely, the size and shape of the steering wheel so that it snugly fits on the steering wheel and b.) made out of flexible material which flexes inward to make a stronger grip on the steering wheel such that the mounting structure is unable to significantly deviate its position on the steering wheel.

In one such embodiment any pair of straps can be tightened by means of, without limitation, a knot, velcro sewn onto or otherwise attached to both straps, or any form of belt buckle. In another such embodiment, any of the singular straps can be tightened by means of, without limitation: a hole or loop on the side of mounting structure directly opposite the side from which the strap emanates such that the strap passes through the loop and a knot can be tied, any form of belt buckle on the side of mounting structure directly opposite the side from which the strap emanates, a hole or loop in the strap which fits over a peg on the side of mounting structure directly opposite the side from which the strap emanates, or mating velcro on two different areas of the strap such that when the strap passes through a loop on the opposite side of the mounting structure from which it emanates the two areas of mating velcro face each other and can attach to each other.

In yet another such embodiment, areas of one or more of the one or more mounting structures which come in contact with the steering wheel are made from, without limitation, rubber or soft plastic with a coefficient of friction high enough to maximize the effect of the pressure fit and minimize the possibility of unwanted slippage on the steering wheel.

In yet still another such embodiment, the user interface includes one or more touch-sensitive sensors and a subset of said touch-sensitive sensors are arranged in a substantially circular array on the one or more mounting structures removably connected to the steering wheel In yet still another such embodiment, the one or more mounting structures removably connected to the steering wheel also include, as part of the electronic interface, a haptic feedback system, for example, a vibration system to produce tactile vibrations which can be felt by a driver holding or otherwise touching the steering wheel. For example, the vibration system may include a small vibrating electric motor. This haptic feedback system (not shown) could be mounted inside mounting structure 10 in a position in proximity to the user's (e.g. driver's) hands when they are placed on the steering wheel. This haptic feedback system may also be connected to analog to digital circuitry 44 of FIG. 5, and could be triggered by a signal transmitted from the personal computing device to the mounting structure 10. For example, a phone application running on the personal computing device may send a signal to the transceiver of mounting structure 10. The transceiver may then trigger the haptic feedback system to vibrate via the analog to digital conversion circuitry. This vibration lets the driver know that action may be needed (e.g. someone is calling).

In an embodiment, the electronic interface includes an output display interface for displaying information to the user where such information might include, without limitation, information regarding whether a wireless connection is operational and/or whether or not a battery needs to be replaced or recharged, and the output display interface includes, without limitation, one or more LEDs, one or more LED displays, and/or one or more flexible displays.

In one such embodiment, the electronic interface is removably connectable to the personal computing device by means of a bi-directional communication channel and the electronic interface includes, without limitation, an output display interface and/or a vibration system. In this embodiment, the software application running on the personal computing device may produce, without limitation, display data to be displayed on a output display interface and/or commands for a vibration system to commence or cease vibrating. Using instructions contained in the software application, information passing from the personal computing device to the electronic interface over the bi-directional communication channel may include, without limitation, the display data to be displayed on the output display interface and/or the commands for the vibration system to commence or cease vibrating.

Without limitation, one or more of the one of more LED displays may correspond to a label for one of one or more touch-sensitive sensors contained in the user interface such that the labels can be different for different software applications running on the personal computing device.

Also without limitation, the bi-directional communication channel may be established by means of a wire, cable, or other direct electrical connection. Using instructions contained in the software application, the personal computing device ensures proper display of any display data on the output display interface and/or ensures the appropriate behavior of the vibration system.

In the case of a personal computing device which contains, without limitation, a wireless receiver and a wireless transmitter, the electronic interface may include, without limitation, a wireless transmitter, a wireless receiver, a memory module, and a microcontroller. Using instructions contained in the software application, the bi-directional communication channel between the personal computing device and the electronic interface is established wirelessly between a.) the wireless transmitter of the electronic interface and the wireless receiver of the personal computing device and b.) the wireless transmitter of the personal computing device and a wireless receiver of the electronic interface. Using programming code stored in the memory module as guidance, the microcontroller: takes any display data received over the bi-directional communication channel and ensures its proper display on the output display interface and/or takes any commands for the vibration system to commence or cease vibrating and ensures the appropriate behavior of the vibration system. Note that, without limitation, the microcontroller can be replaced by a field-programmable gate array, a digital signal processor, a microprocessor, or a programmable intelligent computer.

Also provided herein is a method for accepting user input from an occupant of a motor vehicle to be used by a software application running on a personal computing device. The method includes: receiving, from the occupant of the motor vehicle, the user input, including tactile input, by a user interface designed to receive the user input, and relaying, by an electronic interface, electrically coupled to the user interface and removably connectable to the personal computing device, information about the user input to the software application. The user interface and the electronic interface are each contained in one or more mounting structures that are removably attachable to a portion of the motor vehicle and the user interface receives the user input, which is relayed by the electronic interface to the software application.

In some cases, one or more portable external speakers with a wireless receiver may be available. In some cases, the personal computing device may include, without limitation: one or more speakers built into the personal computing device or an output audio receptacle into which is plugged: one or more speakers, a pair of headphones, a pair of earbuds, or an audio cable connected to the motor vehicle's "line-in" adapter for accepting ⅛" miniplugs from audio sources. In some cases, the personal computing device may also include, without limitation, a wireless transmitter and/or a wireless receiver and a wireless transmitter. Furthermore, in some cases the motor vehicle may include a "line-in" adapter for accepting ⅛" miniplugs from audio sources or a wireless receiver for receiving audio data such that the motor vehicle stereo makes the audio data it receives audible to the occupant of the motor vehicle over the speakers in the motor vehicle.

In such cases, the software application running on the personal computing device may, without limitation, produce audio data which, using instructions contained in the software application, can, without limitation, be made audible using the one or more portable external speakers such that the personal computing device is removably connectable to the portable external speakers by means of a wireless connection established between the wireless transmitter contained within the personal computing device and the wireless receiver contained within the portable external speakers and the audio data is sent wirelessly to these speakers. The software application running on the personal computing device may also, without limitation, produce audio data which, using instructions contained in the software application, can, without limitation, be made audible using: the one or more speakers built into the personal computing device, the one or more speakers plugged into the output audio receptacle of the personal computing device, the pair of headphones plugged into the output audio receptacle of the personal computing device, the pair of earbuds plugged into the output audio receptacle of the personal computing device, or speakers built into the electronic interface.

In the case of the speakers built into the electronic interface: a.) the electronic interface is removably connectable to the personal computing device by means of a bi-directional communication channel, b.) the audio data is sent to the electronic interface over this bi-directional communication channel, and c.) the electronic interface includes an output audio interface for making the audio data audible to the occupant of the motor vehicle. In this case, the bi-directional communication channel could be established by means of a wire, cable, or other direct electrical connection and the software application ensures proper output of the audio data on the output audio interface or the electronic interface could include, without limitation, a wireless transmitter, a wireless receiver, a memory module, and a microcontroller. In this case, the bi-directional communication channel between the personal computing device and the electronic interface is established wirelessly between a.) the wireless transmitter of the electronic interface and the wireless receiver of the personal computing device and b.) the wireless transmitter of the personal computing device and the wireless receiver of the electronic interface, and using programming code stored in the memory module as guidance, the microcontroller ensures proper output of the audio data on the output audio interface The software application running on the personal computing device may also, without limitation, produce audio data which, using instructions contained in the software application, can, without limitation, be made audible using the audio speakers of a motor vehicle. In this case, one of two things can happen. The audio data can be redirected to the motor's vehicle's stereo using the audio cable connected to the motor vehicle's "line-in" adapter for accepting ⅛" miniplugs from audio sources and the motor vehicle stereo can make the audio data audible to the occupant of the motor vehicle over the speakers in the motor vehicle. The other option is that the personal computing device can be removably connectable to the motor vehicle's stereo system by means of a wireless connection established between the wireless transmitter contained within the personal computing device and the wireless receiver contained within the motor vehicle and the audio data can be wirelessly redirected to the motor vehicle's stereo system using this wireless connection at which point the motor vehicle stereo makes the audio data audible to the occupant of the motor vehicle over the speakers in the motor vehicle. In such a case, the wireless transmitter and wireless receiver could use a wireless specification such as, without limitation, Wi-Fi, Bluetooth 3.0, Bluetooth LE, or FM transmission.

In embodiments, the software application running on the personal computing device may also accept input from additional input devices connected to or contained within the personal computing device including, without limitation, a touchscreen, a track ball, a keyboard, a microphone, or one or more accelerometers. The software application running on the personal computing device can use input from the one or more accelerometers to help determine whether or not the motor vehicle is in motion, and, if the software application determines that the motor vehicle is in motion, the software application can temporarily cease to process input from a.) the additional input devices connected to the personal computing device and/or b.) information about the user input relayed by the electronic interface until such motion ceases.

In embodiments, information about the user input relayed by the electronic interface to the personal computing device can cause the software application running on the personal computing device to, without limitation, perform any of the following actions: dictate text or multiple choice questions to the user, activate voice recognition and transcription, commence or end a telephone or video call, mute its output, adjust its output volume, mute its input microphone, adjust its input microphone volume, turn its camera on or off, send text messages, send email, check email, search the user's calendar events, search the user's phone book, browse the web, connect to popular organizational tools like Evernote™ and Asana™, connect to Twitter™, the user's Facebook™ feed, or current news in the category of the user's choice (sport scores, stock market, world news, local weather, etc.), connect to Pandora™, Spotify™, or iHeartRadio™, search for the local gas stations with the lowest gas prices, the local hotel with the best deal according to Hotwire™, or the best local restaurant according to Yelp™ and have the GPS in the personal computing device calculate and display the best way to get there in a way that avoids currently congested traffic areas, connect wirelessly to the motor vehicle, control features of the motor vehicle, check maintenance needs of the motor vehicle, connect to additional hardware, control features of additional hardware removably connected to the personal computing device, and generate sounds which can optionally play simultaneously with music stored in the user's music library on the personal computing device.

Without limitation, the additional hardware which is removably connected to the personal computing device can include: a vibrating car seat cover, an electric fan, an electronic Febreze™ dispenser, a LED sign with programmable words, a rear view camera, a backseat camera, a server, or another personal computing device running a compatible software application.

Also without limitation, the features of the motor vehicle which can be controlled can include: the stereo, the air conditioning, window defrosting, the ignition, gear shifting, the power windows, the power door locks, the headlights, and the car alarm.

In an embodiment, multiple instances of the apparatus can be used concurrently. One user interface can be configured as the host user interface, the electronic interface electrically coupled to this host user interface as the host electronic interface, and the personal computing device receiving information about user input from this host electronic interface as the host personal computing device. This host personal computing device can include, without limitation, a wireless receiver. Each additional user interface can be configured as a client user interface, each electronic interface electrically coupled to a client user interface as a client electronic interface, and each personal computing device receiving information about user input from a client electronic interface as a client personal computing device. Each client personal computing device can include, without limitation, a wireless transmitter.

In such an embodiment, output audio signals can be generated using instructions contained in the software application running on the host personal computing device and instructions contained in the software application running on each client personal computing device. Each client personal computing device is removably connectable to the host personal computing device by means of a wireless connection such that: the wireless connection between each of the one or more client personal computing devices and the host personal computing device is established between the wireless transmitter of the client personal computing device and the wireless receiver of the host personal computing device.

In such an embodiment, the software application running on each client personal computing device has additional functionality in that, it is configured to send, using the wireless connection, client data to the software application running on the host personal computing device. Furthermore, the software application running on the host personal computing device has additional functionality in that, it is configured to receive, using the wireless connection, client data from each client personal computing device. The client data may contain, without limitation, information about user input received by the client apparatus for use in the software application running on the host personal computing device. In this way, user input received by the client apparatus user interface is relayed to the software application running on the host personal computing device.

Without limitation, transmission and receipt of wireless signals between the client personal computing devices and the host personal computing device can be executed by means of one or more Bluetooth connections. Also without limitation, the host personal computing device and each client personal computing device can all be running instances of the same software application. Using a user interface, a user selects whether this user interface functions as a host user interface or a client user interface and the electronic interface relays information to the software application about what the user selects. The software application then ensures the personal computing device running the software application acts as a host personal computing device or client personal computing device as appropriate. In one such embodiment, the host apparatus and client apparatus do not have to be within the same motor vehicle.

Another such embodiment includes multiple personal computing devices which each include, without limitation, a wireless receiver and a wireless transmitter. In this embodiment, the wireless connection between each of the one or more client personal computing devices and the host personal computing device is a bi-directional communication channel established between a.) the wireless transmitter of the client personal computing device and the wireless receiver of the host personal computing device and b.) the wireless transmitter of the host personal computing device and the wireless receiver of the client personal computing device. Over this bi-directional communication channel, the software application running on each client personal computing device is configured to receive host data from the software application running on the host personal computing device.

It should be noted, that although the mounting structures 10 are described above as being mounted to a motor vehicle (e.g. to a steering wheel, dashboard, etc.), the mounting structures 10 may be mounted to any type of motorized and/or non-motorized vehicle (e.g. car, truck, plane, helicopter, boat, Segway, bicycle, etc.). For example, the mounting structure could be mounted to the handlebars of a bicycle. The rider could control their smartphone (e.g. control a music based software application) by triggering the touch sensors on the handlebars of the bicycle (i.e. the rider would not have to take their eyes off the road or their hands off the handlebars to change songs).

While we have shown and described specific embodiments of the present invention, further modifications and improvements will occur to those skilled in the art. While the foregoing written description of the invention enables one skilled in the art to make and use what is considered presently to be the best mode thereof, those skilled in the art will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Also, while the disclosure is presented in terms of embodiments, it should be appreciated that individual aspects of the disclosure can be separately claimed and any subset of these claims is also claimed.

I claim:

1. A motor vehicle mounted device for controlling a personal computing device in a motor vehicle, the motor vehicle mounted device including:
   a steering wheel cover;
   a plurality of touch sensors mounted in the steering wheel cover; and
   a uni-directional communication interface mounted in the steering wheel cover and electrically connected to the plurality of touch sensors,
   wherein the uni-directional communication interface is configured to:
      transmit a first message to the personal computing device in the motor vehicle in response to a first one of the plurality of touch sensors being triggered by a driver of the motor vehicle,
      the first message including first information for identifying the triggered first one of the plurality of touch sensors, the first information dedicated to a first function in a HUB software application on the personal computing device, the first function instructing the HUB software application to select another software application on the personal computing device,
      transmit a second message to the personal computing device in the motor vehicle in response to a second one of the plurality of touch sensors being triggered by a driver of the motor vehicle, and
      the second message including second information for identifying the triggered second one of the plurality of touch sensors, the second information associated with a second function in the another software application, the second function instructing the another software application to perform an action within the another software application,
   wherein:
      the first information is transmitted each time the first one of the plurality of touch sensors is triggered, irrespective of the software application being executed on the personal computing device, and instructs the HUB software application to cycle through a changeable plurality of different software applications on the personal computing device, the changeable plurality of different software applications including third party software applications, and each of the changeable plurality of different software applications are identified by the HUB software application as being compatible with the HUB software application and are selected by the HUB software application to be controlled by the HUB software application,
      the second information is transmitted each time the second one of the plurality of touch sensors is triggered, irrespective of the software application being executed on the personal computing device, and
      the second information is associated with a respective function in the plurality of different software applications on the personal computing device, such that the second one of the plurality of touch sensors is configured to perform a different action within each of the plurality of different software applications by transmitting the second information to the personal computing device.

2. The motor vehicle mounted device of claim 1, wherein the uni-directional communication interface makes use of at least one of a wireless radio frequency (RF), infrared, or ultrasonic communication technique or the personal computing device's audio jack to transmit messages to the personal computing device.

3. The motor vehicle mounted device of claim 1, wherein the first message and the second message each include a respective numerical value that identifies the triggered one of the plurality of touch sensors.

4. The motor vehicle mounted device of claim 1, wherein the personal computing device is mounted to the steering wheel cover.

5. The motor vehicle mounted device of claim 1, wherein the personal computing device includes at least one of a smartphone, a tablet computer, and a personal computer.

6. The motor vehicle mounted device of claim 1, wherein the HUB software application utilizes the first information and the second information to control at least one of functions of the personal computing device, functions of the motor vehicle and functions of another device connected to the personal computing device.

7. The motor vehicle mounted device of claim 1, wherein each of the changeable plurality of different software applications are identified by the HUB software application as being compatible with the HUB software application based on an identifier present in each of the changeable plurality of different software applications.

8. The motor vehicle mounted device of claim 1, wherein the changeable plurality of different software applications are set in a predetermined order by the HUB, and the first information instructs the HUB to cycle through the predetermined order.

9. A personal computing device in a vehicle being controlled by a vehicle mounted device having a touch sensor, the personal computing device including:
a processor;
a memory device electrically connected to the processor; and
a communication interface connected to the processor configured to receive a message from a uni-directional communication interface of the vehicle mounted device, the communication interface configured to:
receive a first message in response to a first one of a plurality of touch sensors of a motor vehicle mounted device being triggered by a driver of the motor vehicle, the first message including first information for identifying the triggered first one of the plurality of touch sensors, the first information dedicated to a first function in a HUB software application in the memory device of the personal computing device,
receive a second message in response to a second one of the plurality of touch sensors of the motor vehicle mounted device being triggered by the driver of the motor vehicle, the second message including second information for identifying the triggered second one of the plurality of touch sensors, the second information associated with a second function in another software application in the memory device, and
wherein the processor, without transmitting a message to the vehicle mounted device, is configured to:
interpret the first information of the first message to execute the first function instructing the HUB software application to select the another software application, and
interpret the second information of the second message to execute the second function instructing the another software application to perform an action within the another software application, and wherein:
the first information is received each time the first one of the plurality of touch sensors is triggered, irrespective of the software application being executed on the personal computing device, and instructs the HUB software application to cycle through a changeable plurality of different software applications on the personal computing device, the changeable plurality of different software applications including third party software applications, and each of the changeable plurality of different software applications are identified by the HUB software application as being compatible with the HUB software application and are selected by the HUB software application to be controlled by the HUB software application,
the second information is received each time the second one of the plurality of touch sensors is triggered, irrespective of the software application being executed on the personal computing device, and
the second information is associated with a respective function in the plurality of different software applications on the personal computing device, such that the personal computing device is configured to perform a different action within each of the plurality of different software applications in response to receiving the second information.

10. The personal computing device of claim 9, wherein the communication interface makes use of at least one of a wireless radio frequency (RF), infrared, or ultrasonic communication technique or the personal computing device's audio jack to perform at least one of transmitting messages to the vehicle mounted device and receiving messages from the vehicle mounted device.

11. The personal computing device of claim 9, wherein the first message and the second message each include a numerical value that identifies the triggered touch sensor.

12. The personal computing device of claim 9, wherein the personal computing device is mounted to a steering wheel cover that includes the triggered touch sensor.

13. The personal computing device of claim 9, wherein the personal computing device is at least one of a smartphone, a tablet computer, and a personal computer.

14. The personal computing device of claim 9, wherein the HUB software application controls at least one of functions of the personal computing device, functions of the vehicle, and functions of another device connected to the personal computing device.

15. A vehicle system including:
a personal computing device including:
a processor,
a memory device electrically connected to the processor, the memory device including a HUB software application and another software application,
a communication interface connected to the processor; and
a mounting structure attached to the vehicle, the mounting structure including:
a plurality of touch sensors on a surface of the mounting structure; and a wireless uni-directional communication interface inside the mounting structure and electrically connected to the plurality of touch sensors, wherein the wireless uni-directional communication interface is configured to:

transmit a first message to the personal computing device in the motor vehicle each time a first one of the plurality of touch sensors being triggered by a driver of the motor vehicle, irrespective of the software application being executed on the personal computing device, the first information dedicated to a first function in the HUB software application, and transmit a second message to the personal computing device in the motor vehicle each time a second one of the plurality of touch sensors being triggered by a driver of the motor vehicle, irrespective of the software application being executed on the personal computing device, the second information associated with a second function in the another software application, wherein the personal computing device, without transmitting a message to the mounting structure, is configured to:

interpret the first information of the first message to execute the first function instructing the HUB software application to cycle through a changeable plurality of different software applications on the personal computing device, the changeable plurality of different software applications including third party software applications, and each of the changeable plurality of different software applications are identified by the HUB software application as being compatible with the HUB software application and are selected by the HUB software application to be controlled by the HUB software application, and interpret the second information of the second message to execute the second function instructing one of the plurality of different software applications to perform an action within the one of the plurality of different software applications, and wherein the second information is associated with a respective function in the plurality of different software applications being executed on the personal computing device, such that the second one of the plurality of touch sensors is configured to perform a different action within each of the plurality of different software applications by transmitting the second information to the personal computing device.

16. The vehicle system of claim 15, wherein the wireless uni-directional communication interface makes use of at least one of a wireless radio frequency (RF), infrared, or ultrasonic communication technique or the personal computing device's audio jack to transmit messages to the personal computing device.

17. The vehicle system of claim 15, wherein the first message and the second message each include a numerical value that identifies the triggered at least one touch sensor.

18. The vehicle system of claim 15, wherein the mounting structure is mounted to the vehicle with at least one of:

adhesive, a suction cup, a spring clip, a pair of strips of thin plastic, one strip of the pair covered with loops and another strip of the pair covered with hooks for detachably coupling with one another, and a pressure fit such that a portion of the mounting structure is molded to accept the size and shape of the personal computing device.

19. The vehicle system of claim 15, wherein the personal computing device includes at least one of a smartphone, a tablet computer, and a personal computer.

20. The vehicle system of claim 15, wherein the another software application is a software application that is configured to control at least one of functions of the personal computing device, functions of the vehicle, and functions of another device connected to the personal computing device.

* * * * *